June 12, 1928.
C. C. VAN ARSDALE
1,673,723
CONDUIT CONNECTION
Filed Sept. 17, 1925
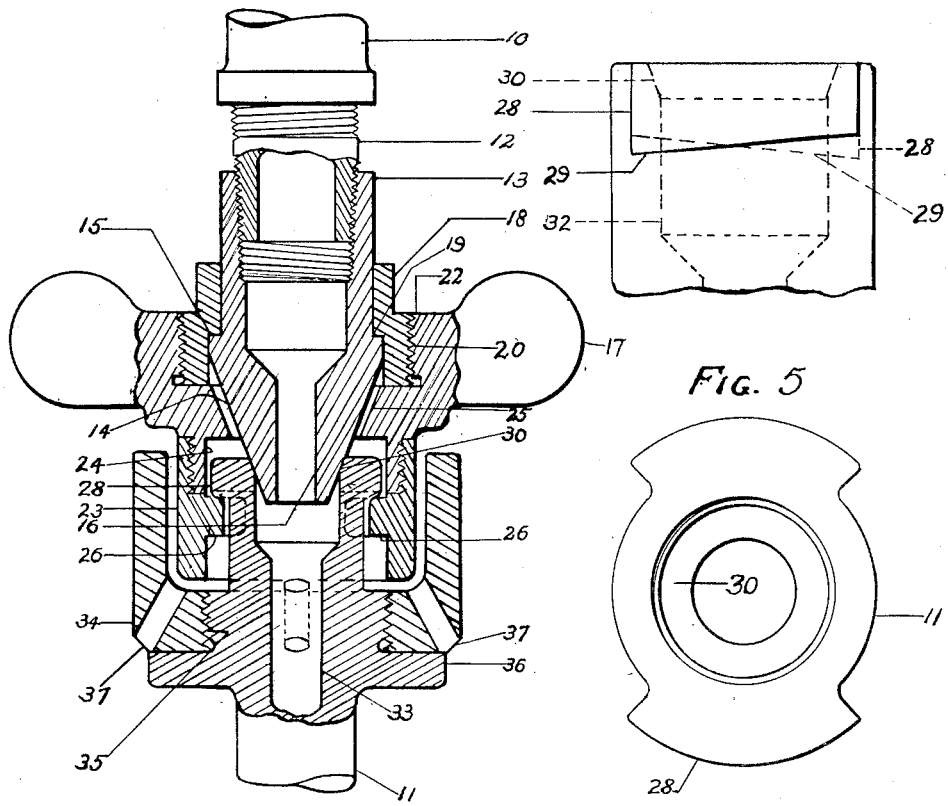
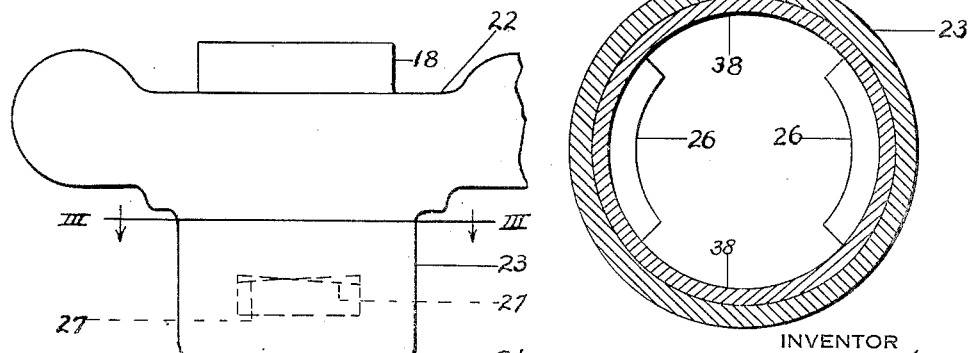
INVENTOR
Clarence. C. Van. Arsdale
BY
R. D. Trogner
ATTORNEY Patented June 12, 1928.

1,673,723

UNITED STATES PATENT OFFICE.

CLARENCE C. VAN ARSDALE, OF AKRON, OHIO, ASSIGNOR TO THE GOODYEAR TIRE & RUBBER COMPANY, OF AKRON, OHIO, A CORPORATION OF OHIO.

CONDUIT CONNECTION.

Application filed September 17, 1925. Serial No. 56,949.

My invention relates to conduits for fluids and it has particular relation to a connecting device for temporarily securing together sections of piping for the purpose of conveying fluid under pressure.

One object of my invention is to provide a connecting device which is adapted to be applied at the ends of opposed pipe sections and which is so constructed that it will effect a fluid-tight connection between sections with a minimum loss of time.

Another object of my invention is to provide a connection which is so constructed of cooperating parts, adapted to be secured to the opposing ends of pipe sections, that only a slight manual operation is required to effect a fluid-tight connection between such pipe sections.

Various methods of connecting pipes together have been employed which have given satisfaction, so far as the effectiveness is concerned after the connection is made. In cases where the saving of time is an important factor, it has been desirable to provide connecting devices which may be firmly joined and disengaged very quickly without the use of wrenches or other tools. This is especially desirable where a number of such connections are to be made adjacent each other. The known connections for pipes have consisted of elements at the end of one pipe section so related to the elements at the opposing end of another pipe section that they may be screwed together.

My invention is particularly adapted to effect fluid-tight connections between sections of pipes communicating with several vulcanizing molds which are generally stacked in superposed position, incident to the vulcanization process. In stacking the vulcanizing molds, in order that a number of them may be inserted at one time within a heating chamber, the interior of each one communicates with a main manifold conveying fluid, such as air or steam, under pressure by means of relatively short pipe sections disposed at intervals along the manifold. It is the aim of my invention to provide novel individual connecting means between each mold and a connecting pipe joint secured to the manifold.

A device embodying my invention consists generally of a nozzle secured upon one end of a pipe section, the outside of the nozzle at one end thereof being tapered and adapted to fit into a tapered opening formed in the end of an opposing pipe section. The nozzle is held snugly in the tapered opening by means of a sleeve which constitutes a part of a manually operated wing nut and which is formed with beveled portions cooperating with beveled lugs formed on one of the pipe sections. The beveled surfaces of the wing nut and lugs respectively, cooperate to draw the pipe sections toward each other when the wing nut is turned in one direction of rotation and the sections are released when the wing nut is turned in the opposite direction.

For a better understanding of my invention, reference may now be had to the accompanying drawings forming a part of this specification, of which;

Fig. 1 is a cross-sectional view of a pipe connecting device embodying my invention and illustrating elements thereof in assembled position;

Fig. 2 is an elevational view of a wing nut employed as a fastening member, constituting a part of my invention;

Fig. 3 is a cross-sectional view taken substantially along the line III—III of Fig. 2;

Fig. 4 is a fragmentary view, on a larger scale, illustrating in detail the construction of one end of a pipe section to be employed in my invention; and Fig. 5 is a plan view of the end of the pipe section shown in Fig. 3.

In practicing my invention I have constructed a device adapted to secure together two pipe sections 10 and 11 in order that a fluid-tight engagement may be effected therebetween. At the end of the pipe section 10, I have provided a short externally threaded element 12 which is, at one end, screwed into the end of the section 10, and at the other end is screwed into an enlarged socket at the end of a nozzle 13. The other end of the nozzle 13 is formed with a tapering portion 14 and an intermediate part of the nozzle is provided with an integral external annular shoulder 15. A reduced opening 16 extends through the tapering portion of the nozzle.

The shoulder 15 on the nozzle is designed for the purpose of seating a wing nut 17, which is composed of several elements including an upper sleeve 18 formed with an internal annular shoulder 19 and screwed into a threaded depression 20 of an intermediate portion 22 of the wing nut. A lower sleeve member 23 is threaded upon an annular flange 24 formed on the intermediate portion of the wing nut. It will be observed that the cooperating shoulders 15 and 19 prevent the wing nut from sliding from the end of the nozzle, and that an opening 25, slightly larger than the adjacent tapered portion of the nozzle, is provided in the wing nut for the purpose of limiting the sliding movement thereof toward and away from the section 10.

As best shown in Figs. 2 and 3, the lower sleeve member 23 is formed with two internal diametrically opposite lugs 26 which have biased or beveled surfaces, as indicated at 27. The end of the pipe section 11 is formed with a pair of diametrically opposite lugs 28 which are provided with biased or beveled surfaces 29 and are also provided with a tapering seat 30 adapted to receive the tapered end 14 of the nozzle. In order to insure ample space for the end of the nozzle 13 to enter the adjacent end of the section 11, an enlarged opening 32 is formed therein which merges into a smaller opening 33, the latter constituting the main conduit opening adapted to communicate with a supply of fluid under pressure. Adjacent the end of the section 11, I have provided an enlarged collar or shield 34, threaded at its lower portion upon the section 11, as indicated at 35, and abutting against a flange 36, formed adjacent the threaded portion of the section 11. A plurality of openings 37 are provided in the end of the collar member to permit the escape of dust, liquid, or such foreign particles as might tend to collect therein.

In bringing together the ends of the pipe sections 10 and 11, the end of the latter including the lugs 28, is thrust into the sleeve 23 in such manner that the lugs 28 slide past the lugs 26 through notched portions 38 defined by the contour of the sleeve 23 and the lugs 26. Then, by manually applying a quarter turn to the wing nut 17, the surfaces 27 and 29 engage each other and thus draw the tapered portion 14 snugly into engagement with the seating portion 30. It will be noted that the degree to which the surfaces 27 and 29 are beveled is such that the engaging parts will be maintained in firm contact with each other after the wing nut has been turned. When it is desired to disengage the sections 10 and 11, the wing nut is turned in the direction opposite to that just described.

It will be seen from the above description that I have provided a conduit connecting device in which a fluid-tight engagement is quickly effected by simple operation and which is particularly adapted for use where a number of such connections must be repeatedly made.

Although I have illustrated but one form which my invention may assume and have described in detail but a single application thereof, it will be apparent to those skilled in the art that it is not so limited, but that various minor modifications and changes may be made therein without departing from the spirit of my invention or from the scope of the appended claims.

What I claim is:

1. A coupling construction for connecting two pipe sections comprising a tapered nozzle provided with a circumferential shoulder, a wing-nut slidably mounted on the nozzle and provided with a shoulder portion adapted to engage the shoulder of the nozzle, said wing-nut being provided with a tapered opening adapted to cooperate with the tapered nozzle thereof to limit the movement of the wing-nut, a screw threaded ring provided with internal beveled lugs and constituting a portion of the wing-nut, and externally beveled lugs provided on one of the pipe sections cooperating with the internal beveled lugs to draw the tapered portion of the nozzle into engagement with the last named pipe section when the wing-nut is turned.

2. The combination with two pipe sections provided respectively with a tapered nozzle formed with a shoulder thereon and a pair of externally beveled lugs of a wing-nut comprising a ring slidably mounted upon the nozzle and provided with a shoulder portion adapted to engage the shoulder of the nozzle, a body portion threaded upon the ring being provided with a tapered opening adapted to cooperate with said tapered nozzle to limit movement of the wing-nut and a screw threaded ring secured to the body portion, the screw threaded ring being provided with internal beveled lugs adapted to cooperate with the external beveled lugs of one pipe section to draw the tapered portion of the nozzle into engagement with the last named pipe section when the wing nut is turned.

3. The combination with two pipe sections provided respectively with a tapered nozzle formed with a shoulder thereon and a pair of external beveled lugs, of a wing-nut comprising a shoulder portion and an internal annular beveled portion for engaging the shoulder and tapered portions of the nozzle respectively, said wing-nut also being provided with internal beveled lugs adapted to engage the external lugs of one pipe section to draw the nozzle into tight engagement therewith when the wing-nut is turned and an annular flanged shield threaded upon the end of the last-named pipe section being adapted to inclose the portion of the wing-nut engaging the latter.

4. A coupling comprising a wing nut having a central portion, a collar threaded on one end of the central portion, and an annular member threaded over the other end of the central portion, the annular member being formed with spaced lugs having beveled surfaces, adapted to engage oppositely disposed lugs of an air connection to effect an air-tight fit.

5. The combination with two pipe sections provided respectively wtih a tapered nozzle formed with a shoulder thereon and a pair of external beveled lugs, of a wing nut comprising a shoulder portion and an internal annular beveled portion for engaging the shoulder and tapered portions of the nozzle respectively, said wing nut also being provided with internal beveled lugs adapted to engage the external lugs of one pipe section to draw the nozzle into tight fitting engagement therewith when the wing nut is turned.

In witness whereof, I have hereunto signed my name.

CLARENCE C. VAN ARSDALE.